US012771401B2

(12) United States Patent
Laraway et al.

(10) Patent No.: US 12,771,401 B2
(45) **Date of Patent: *Oct. 20, 2026**

(54) RAKE RECEIVER AND RELATED METHODS

(71) Applicant: L3HARRIS TECHNOLOGIES, INC., Melbourne, FL (US)

(72) Inventors: Stephen A Laraway, Kaysville, UT (US); David G. Landon, Bountiful, UT (US); Edwin J. Hemphill, Kaysville, UT (US); David S. Nelson, Salt Lake City, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/747,592

(22) Filed: Jun. 19, 2024

(65) Prior Publication Data

US 2024/0340039 A1 Oct. 10, 2024

Related U.S. Application Data

(63) Continuation of application No. 17/447,849, filed on Sep. 16, 2021, now Pat. No. 12,063,063.

(51) Int. Cl.
*H04B 1/7115* (2018.01)

(52) U.S. Cl.
CPC .................................. *H04B 1/7115* (2013.01)

(58) Field of Classification Search
CPC ................ H04B 1/7115; H04B 7/0845; H04B 2001/70706; H04B 2201/70707; H04B 1/7085

See application file for complete search history.

(56) References Cited

U.S. PATENT DOCUMENTS 6,330,271 B1 12/2001 Klang et al.
6,426,949 B1 * 7/2002 Zhou ...................... H04B 1/707 375/140
7,790,929 B2 9/2010 Reiffenrath (Continued)

FOREIGN PATENT DOCUMENTS

EP 1162756 12/2001
KR 20060098737 9/2006

OTHER PUBLICATIONS

Kaasila etal , "The adaptive rake matched filter in a time-variant two-path channel," [1992 Proceedings] The Third IEEE International Symposium on Personal, Indoor and Mobile Radio Communications, Boston, MA, USA, 1992, pp. 441-445 (Year: 1992).*

(Continued)

*Primary Examiner* — Sam K Ahn

*Assistant Examiner* — Amneet Singh

(74) *Attorney, Agent, or Firm* — ALLEN, DYER, DOPPELT, + GILCHRIST, P.A.

(57) ABSTRACT

A radio frequency (RF) rake receiver may include a plurality of diversity receive paths, with each diversity receive path including a respective rake receiver despreader, and a tracking loop. The tracking loop may be configured to generate a composite timing signal based upon the rake receiver despreaders, and provide the composite timing signal to the diversity receive paths.

22 Claims, 4 Drawing Sheets

(56) References Cited

U.S. PATENT DOCUMENTS

| | | | | |
|---|---|---|---|---|
| 2001/0028676 | A1* | 10/2001 | Ohsuge | H04B 1/7113 375/150 |
| 2002/0186708 | A1 | 12/2002 | Chen et al. | |
| 2003/0142726 | A1 | 7/2003 | Eltawil et al. | |
| 2004/0264604 | A1* | 12/2004 | Malette | H04B 1/7103 375/350 |
| 2005/0036537 | A1* | 2/2005 | Zancho | H04L 1/20 375/E1.032 |
| 2006/0068714 | A1 | 3/2006 | Sharma et al. | |
| 2006/0126705 | A1 | 6/2006 | Bachi et al. | |
| 2006/0171491 | A1 | 8/2006 | Tapaninen et al. | |
| 2007/0098051 | A1 | 5/2007 | Shesha et al. | |
| 2008/0063034 | A1 | 3/2008 | Yang et al. | |
| 2008/0212655 | A1 | 9/2008 | Li | |
| 2011/0080982 | A1 | 4/2011 | Bottomley et al. | |
| 2011/0310934 | A1* | 12/2011 | Lin | H04B 7/0805 375/130 |
| 2016/0365991 | A1* | 12/2016 | Ganesan | H04B 1/7115 |

OTHER PUBLICATIONS

Kyosti et al. "IST-4-027756 Winner II, 01.1.2 V1.2, Winner II Channel Models" https://cept.org/files/8339/winner2%20-%20final%20report.pdf, 2008. pgs. 82 See Priority U.S. Appl. No. 17/447,849, filed Sep. 16, 2021.

Erup et al. "Interpolation in digital modems—Part II: Implementation and performance" IEEE Transactions on Communications, vol. 41, No. 6, pp. 998-1008, Jun. 1993, doi: 10.1109/26.231921. See Priority U.S. Appl. No. 17/447,849, filed Sep. 16, 2021.

F. M. Gardner, "Interpolation in digital modems—Part I. Fundamentals" IEEE Transactions on Communications, vol. 41, No. 3, pp. 501-507, Mar. 1993, doi: 10.1109/26.221081. See Priority U.S. Appl. No. 17/447,849, filed Sep. 16, 2021.

E. S. Lohan "Multipath Delay Estimators for Fading Channels with Applications in COMA Receivers and Mobile Positioning" Tampere University of Technology Publications 434: 2003; pp. 116 See Priority U.S. Appl. No. 17/447,849, filed Sep. 16, 2021.

A. P. Hulbert "Comprehensive Rake—a novel and practical receiver architecture offering improved performance" Spread Spectrum Techniques and Applications, 1994. pp. 5 See Priority U.S. Appl. No. 17/447,849, filed Sep. 16, 2021.

Barriac et al. "Characterizing outage rates for space-time communication over wideband channels" IEEE Transactions on Communications, vol. 52, No. 12, Dec. 2004; pp. 2198-2208. See Priority U.S. Appl. No. 17/447,849, filed Sep. 16, 2021.

Povey et al. "A decision-directed spread-spectrum RAKE receiver for fast-fading mobile channels" IEEE Transactions on Vehicular Technology: vol. 45, No. 3, Aug. 1996; pp. 491-502 See Priority U.S. Appl. No. 17/447,849, filed Sep. 16, 2021.

Baykas et al."Effects of tap spacings to discrete-time Rake receives in exponentially decaying delay profiles" ICIC, 2006. pp. 2287-2289. See Priority U.S. Appl. No. 17/447,849, filed Sep. 16, 2021.

Adachi et al. "Wideband OS-COMA for next-generation mobile communications systems" IEEE Communications Magazine, Sep. 1998; pp. 56-69. See Priority U.S. Appl. No. 17/447,849, filed Sep. 16, 2021.

G. Turin "Introduction to spread-spectrum antimultipath techniques and their application to urban digital radio" Proc IEEE: vol. 68, No. 3, Mar. 1980; pp. 328-353 See Priority U.S. Appl. No. 17/447,849, filed Sep. 16, 2021.

D'Amours et al. "Comparison of pilot symbol-assisted and differentially detected BPSK for DS-CDMA systems employing rake receivers in Rayleigh fading channels" IEEE Trans on Veh Tech: Vo147, No. 4, Nov. 1998; pp. 1258-1267 See Priority U.S. Appl. No. 17/447,849, filed Sep. 16, 2021.

Erben et al. "Performance of rake receivers in realistic mobile radio environments" Inti Symp on Spread Spectrum Techniques and Applications, 1994; pp. 730-733. See Priority U.S. Appl. No. 17/447,849, filed Sep. 16, 2021.

Cassioli et al. "Performance of low-complexity RAKE reception in a realistic UWB channel" IEEE Transaction on Communications: 2007; pp. 763-767. See Priority U.S. Appl. No. 17/447,849, filed Sep. 16, 2021.

Casini et al. "DVB-S2 modem algorithms design and performance over typical satellite channels" Broadband Satellite Systems, 2004: 22:281-318 See Priority U.S. Appl. No. 17/447,849, filed Sep. 16, 2021.

Morelli et al. "Further results in carrier frequency estimation for transmissions over flat fading channels" IEEE Communications Letters: vol. 2, No. 12, Dec. 1998; pp. 327-330 See Priority U.S. Appl. No. 17/447,849, filed Sep. 16, 2021.

Kuo et al. "Frequency offset compensation of pilot symbol assisted modulation in frequency flat fading" IEEE Transactions on Communications: vol. 45, No. 11, Nov. 1997; pp. 1412-1416. See Priority U.S. Appl. No. 17/447,849, filed Sep. 16, 2021.

Krasny et al. "Doppler spread estimation in mobile radio systems" IEEE Communications Letters: vol. 5, No. 5, May 1997; pp. 197-199. See Priority U.S. Appl. No. 17/447,849, filed Sep. 16, 2021.

Nguyen et al."A Novel Residual Frequency Estimation Method for GNSS Receivers" Sensors, 2018; pp. 19. See Priority U.S. Appl. No. 17/447,849, filed Sep. 16, 2021.

Jayaraman et al."Determining Code Symbol LLRs on Diversity Channels with Applications to COMA 2000" Spread-Spectrum Tech and Applications: Sep. 2-5, 2002; pp. 807-811 See Priority U.S. Appl. No. 17/447,849, filed Sep. 16, 2021.

Tatsunami et al."On the performance of LDPC codes with differential detection over Rayleigh fading channels" Vehicular Technology Conference: 2006; pp. 2388-2392. See Priority U.S. Appl. No. 17/447,849, filed Sep. 16, 2021.

Frigon et al., "Design and implementation of a baseband WCDMA dual-antenna mobile terminal", IEEE Transactions on Circuits and Systems Part 1, vol. 54, No. 3, Mar. 2007, pp. 518-529.

* cited by examiner

RAKE RECEIVER AND RELATED METHODS

RELATED APPLICATIONS

This application is a continuation application of U.S. patent application Ser. No. 17/447,849 filed Sep. 16, 2021, which is incorporated herein in its entirety by reference.

TECHNICAL FIELD

The present application relates to radio frequency (RF) communications devices, and, more particularly, to rake receivers and related methods.

BACKGROUND

In radio frequency (RF) communications, rake receivers are used to help counter the effects of multipath fading. A rake receiver includes several "fingers", each acting as a tap in a receive filter used to combine receive energy arriving at different time offsets for a different multipath component. Each multipath component is independently decoded by a given finger, and the output of all of the fingers are later added coherently to improve the reliability of the information being communicated.

One example rake finger receiver configuration is set forth in U.S. Pat. No. 7,990,929 to McPherson. This patent discloses a wireless communications device that includes a path searcher for detecting signal peak locations in a received spread-spectrum signal, and a RAKE finger stage. The RAKE finger stage includes a plurality of RAKE fingers for determining symbol values from the received spread-spectrum signal based upon the detected peak locations. Each RAKE finger may include at least one de-spreader for de-spreading time-staggered versions of the received spread-spectrum signal and operating at a signal rate of the received spread-spectrum signal, and a frequency corrector downstream from the at least one de-spreader comprising a phase lock loop (PLL) operating at a rate that is less than the signal rate.

Despite the advantages of such systems, further advancements in rake receivers may be desirable in certain applications.

SUMMARY

A radio frequency (RF) rake receiver may include a plurality of diversity receive paths (e.g., spatial diversity, frequency diversity, polarization diversity), with each diversity receive path including a respective rake receiver despreader, and a tracking loop. The tracking loop may be configured to generate a composite timing signal based upon the plurality of rake receiver despreaders, and provide the composite timing signal to the plurality of diversity receive paths.

More particularly, each rake receiver despreader may provide a plurality of rake fingers. Also, each rake receiver despreader may comprise a non-sparse rake receiver despreader, for example. In an example embodiment, each diversity receive path may include a respective downconverter and a fractional interpolator coupled thereto. More particularly, each diversity receive path may include a respective antenna coupled to the downconverter, as well as a respective matched filter coupled to the downconverter.

In an example implementation, the tracking loop may include a timing error detector, a loop filter coupled to the timing error detector, and a numerically controlled oscillator coupled to the loop filter. The RF rake receiver may also include a log-likelihood calculation circuit coupled to the plurality of rake receiver despreaders.

A related method may include operating a plurality of diversity receive paths, with each diversity receive path comprising a respective rake receiver despreader. The method may further include operating a tracking loop to generate a composite timing signal based upon the plurality of rake receiver despreaders, and provide the composite timing signal to the plurality of diversity receive paths.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

By way of background, typical rake receivers generally rely on N-fold replication of the entire receiver path for each diversity input (antenna, frequency, etc.). This costs N-fold resources and leaves each diversity input tracking loop independently exposed to fading effects.

In a "sparse" rake receiver configuration, each finger is assigned a delay that corresponds to a significant multipath component. Chip and carrier tracking are performed independently for each finger. A path searcher estimates the power delay profile and uses this estimate to assign path delays to each of the rake fingers. One benefit of the sparse rake is low complexity. However, a difficulty with this architecture is finding, tracking and managing the rake fingers. This is because the power delay profile (PDP) is constantly changing as the platform(s) moves in its environment.

Some approaches are able to account for non-sparse rake fingers, but they generally only use a contiguous bank of fingers, e.g., only addressing delay spread, with no combining of synchronization inputs across diversity inputs. In a "non-sparse" configuration, a half-chip despreader performs despreading at every half chip delay over a certain range. The output of the despreader is processed to detect the symbols. Typically this architecture only includes a single chip timing loop for the full rake receiver.

Figure 1:
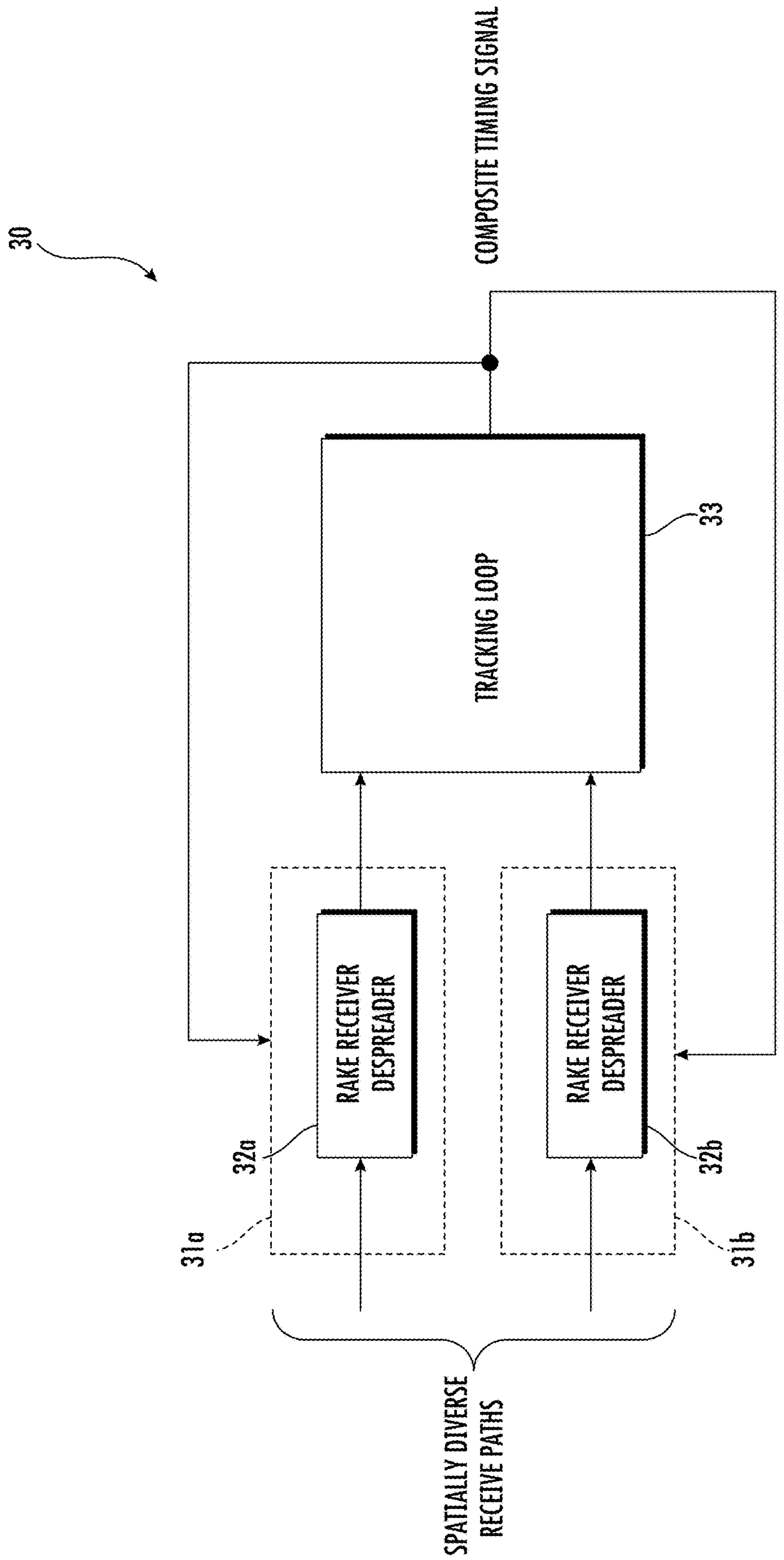
FIG. 1 is a schematic block diagram of a portion of an RF rake receiver in accordance with an example embodiment.

Referring initially to FIG. 1, a radio frequency (RF) rake receiver 30 in accordance with an example embodiment is first described. Generally speaking, the rake receiver 30 distributes rake fingers across diversity inputs, enabling enhanced diversity for reduced outages. Sharing of fingers across k distinct diversity branches requires fewer resources than would including k copies of a rake receiver, enabling improved performance in RF devices too small to host k full receivers (e.g., RF radios, mobile phones, etc.) Further, all rake fingers can be dedicated to a single diversity path, without leaving resources idle as typical multi-receiver approaches might, given the typical association of rake fingers with a single rake receiver, rather than a pool of fingers shared by k rake receivers.

The rake receiver 30 illustratively includes a plurality of diversity receive paths 31*a*, 31*b*, which in the present example are spatial diversity receive paths, but in other embodiments they may have frequency diversity or polarization diversity, for example. Each spatial diversity receive path illustratively includes a respective rake receiver despreader 32*a*, 32*b*, and a tracking loop 33. As will be discussed further below, the tracking loop 33 is configured to generate a composite timing signal based upon the plurality of rake receiver despreaders 32*a*, 32*b*, and provide the composite timing signal to the plurality of spatial diversity receive paths 31*a*, 31*b*.

The composite timing feedback has the advantage of synchronization diversity across inputs, e.g., distinct frequencies or antennas. In a typical feedback design (e.g., separate tracking per diversity input), a diversity input in a deep fade might drift and lose lock requiring costly re-acquisition. The rake receiver 30 advantageously avoids this drawback of prior systems.

Figure 2:
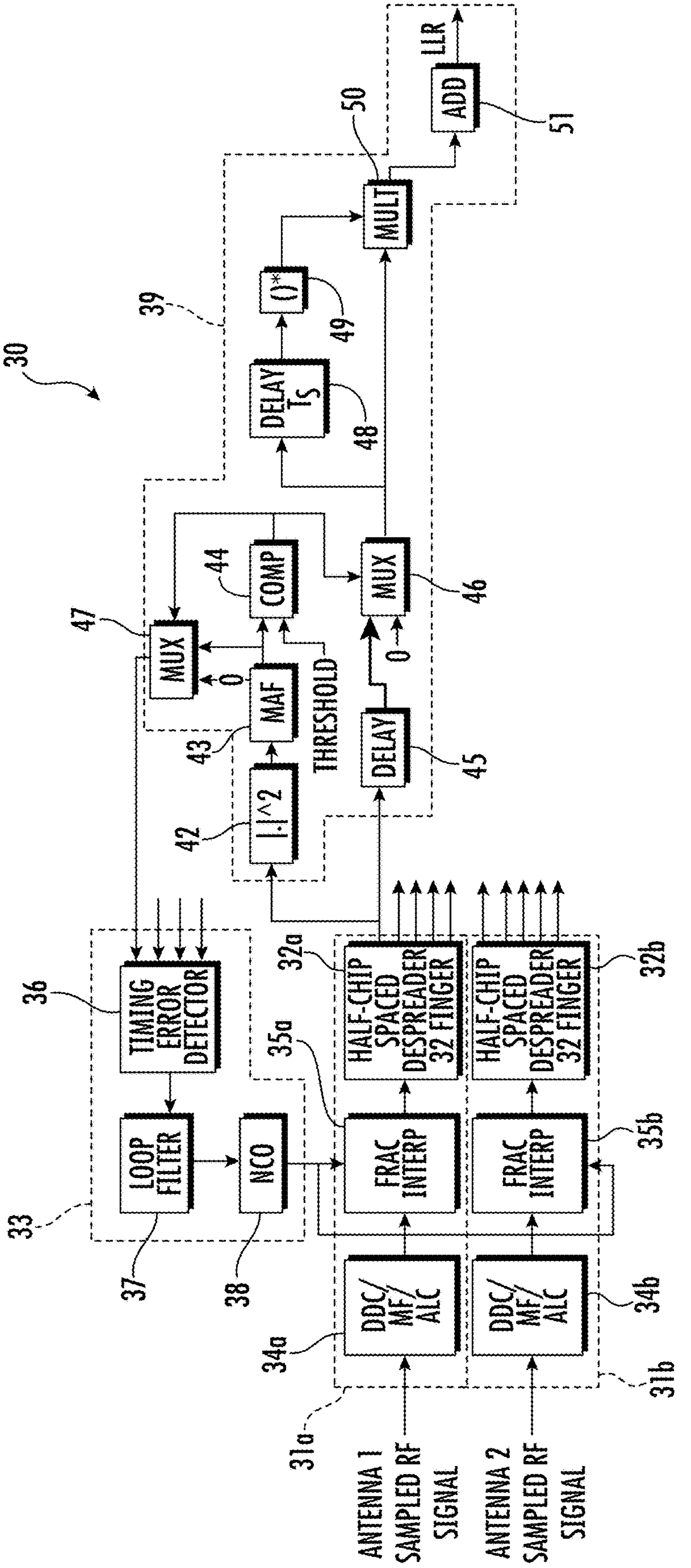
FIG. 2 is a more detailed schematic block diagram of an example implementation of the RF rake receiver of FIG. 1.

Turning to FIG. 2, an example differential (non-coherent) rake (DRake) implementation of the rake receiver 30 is now described. The illustrated DRake configuration uses non-sparse (e.g., having a number of rake fingers chosen to span one or more portions of the delay spread rather than to correspond to a specific multipath component) despreaders 32*a*, 32*b* to combine energy from the receive power delay profile as sampled from one to N distinct diversity inputs, e.g., antennas and/or frequencies. This allows for resource-efficient trades of diversity against the channel delay spreads. In particular, the receiver may have a fixed number of rake fingers that can be distributed between the diversity paths in a way that optimizes performance. For example, in a channel where the diversity paths are highly correlated distributing all the fingers to a single diversity path will provide the optimal performance. More particularly, in the illustrated configuration the despreaders 32*a*, 32*b* are half-chip despreaders. This reconfiguration may be done real-time as channel conditions change.

A number (e.g., 64) of half-chip spaced despread paths are shared between the two receive antenna paths 31*a*, 31*b*. Unlike the despreaders 32*a*, 32*b*, certain components 34*a*, 34*b* are replicated per antenna, e.g., a digital down converter (DDC), matched filter (MF), automatic level control (ALC), as well as interpolators 35*a*, 35*b* (Frac interp). Others may be shared without modification, such as the tracking loop 33 (which illustratively includes a timing error detector 36, loop filter 37, and numerically controlled oscillator (NCO) 38) and path selection, differential detection, and log-likelihood calculation circuitry 39. As a result, tracking loops can rely on inputs across delay spread, as well as antenna, and/or frequency diversity inputs.

The ALC adjusts the amplitude of the input signal sample so that the average magnitude squared of the output samples are at a set level. The differential detection and log-likelihood ratio (LLR) calculation circuitry 39 outputs LLRs as needed by many forward error correction decoders.

The differential detection and log-likelihood calculation circuitry 39 illustratively includes a block 42 which performs the function of squared magnitude (this is a measure of the signal power), followed by a moving average filter (MAF) 43 to smooth the power estimate. A comparator 44 compares the output of the MAF with a threshold. The comparator 44 and muxes (46 and 47) perform a path select operation that ignores rake finger that do not have significant signal energy. Path select is done because rake fingers with small power mainly contribute noise into the combined signal which degrades performance. The delay element 45 is a matching pipeline delay that aligns the output of the despreader to the corresponding comparator output. The output of the delay element is provided to a multiplexer 46 along with a zero value and the output of the comparator 44. A multiplexer 47 receives its inputs from the MAF 43 and the comparator 44, and this multiplexer provides the output of the log-likelihood calculation circuitry 39 to the timing error detector 36. An output of the multiplexer 46 is also provided to a delay element 48, which is followed by a complex conjugation block 49. A multiplier 50 receives as its inputs the output of the block 49 and the multiplexer 46. Blocks 48, 49 and 50 form a differential detector. The output of the multiplier 50 is provided to an add block 51, which outputs the signal LLR.

Figure 3:
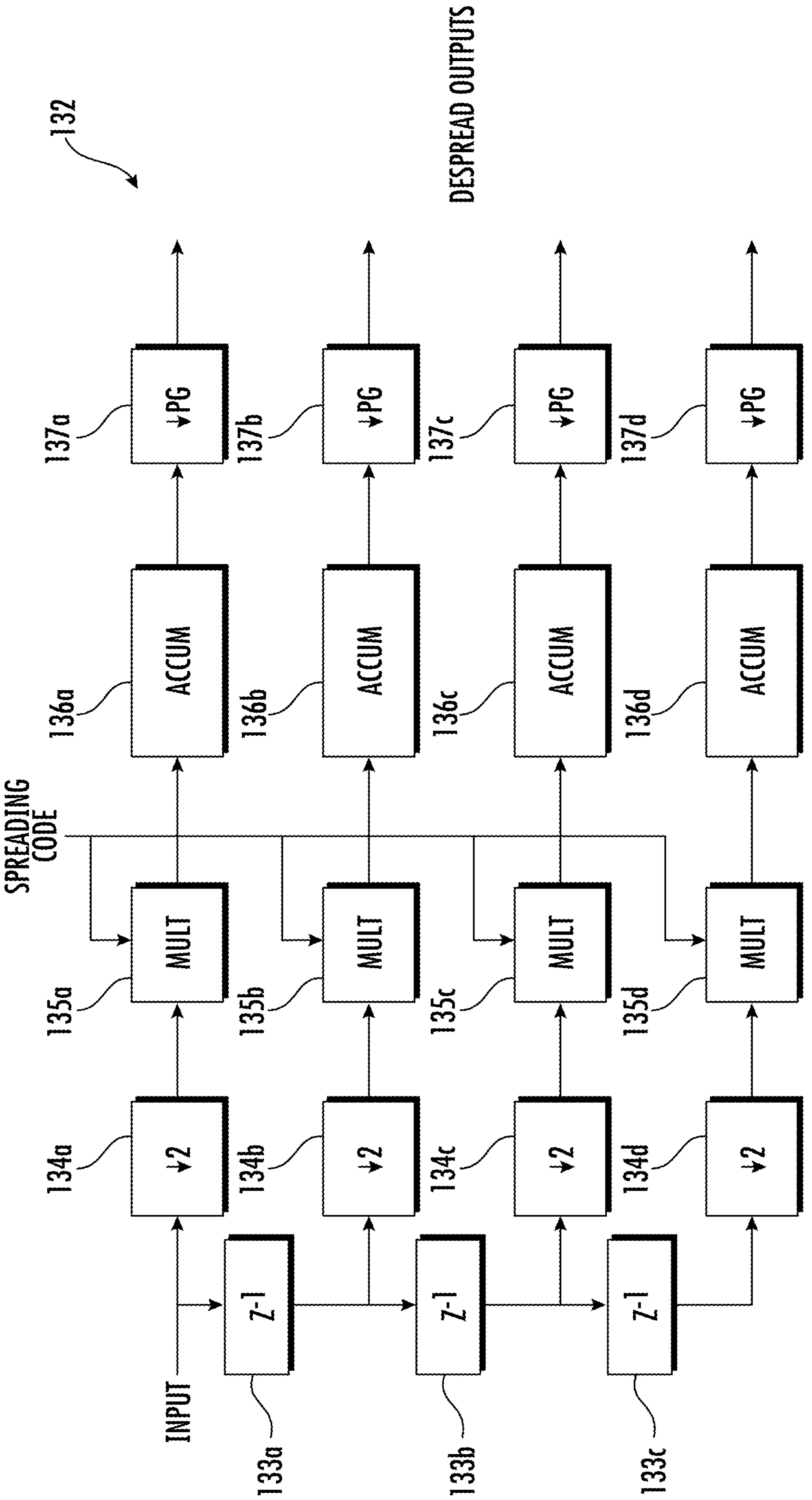
FIG. 3 is a schematic block diagram of an example half-chip despreader configuration which may be used in the system of FIG. 2.

An example implementation of a half-chip spaced despreader 132 is now described with reference to FIG. 3. In the illustrated example, there are four rake fingers, but it will be appreciated that more fingers may be used (e.g., thirty-two in the case of the half-chip despreaders 32*a*, 32*b* of FIG. 2). The signal path input is provided to each of the rake fingers via a sample delay block, $z^{-1}$, blocks 133*a*-133*c* and a decimate by two, ↓2, blocks 134*a*-134*d*. Outputs of the blocks 134*a*-134*d* are provided to multipliers 135*a*-135*d*, which also receive a spreading code. Outputs of the multipliers 135*a*-135*d* are provided to respective accumulators 136*a*-136*d*, which in turn provide inputs for respective decimation by the processing gain (processing gain is the number of chips per symbol), ↓PG, blocks 137*a*-137*d*. The blocks 137*a*-137*d* provide the despread outputs for each finger.

Pre-multiplying the input data by the constellation points and using multiplexers, this structure may be implemented using relatively few multipliers. Also, at the despreader output the sample rate is 2*PG less than the despreader input sample rate. This enables sharing of other resources (e.g., those which may be present in a field-programmable gate array or FPGA implementation) after the despreader.

Figure 4:
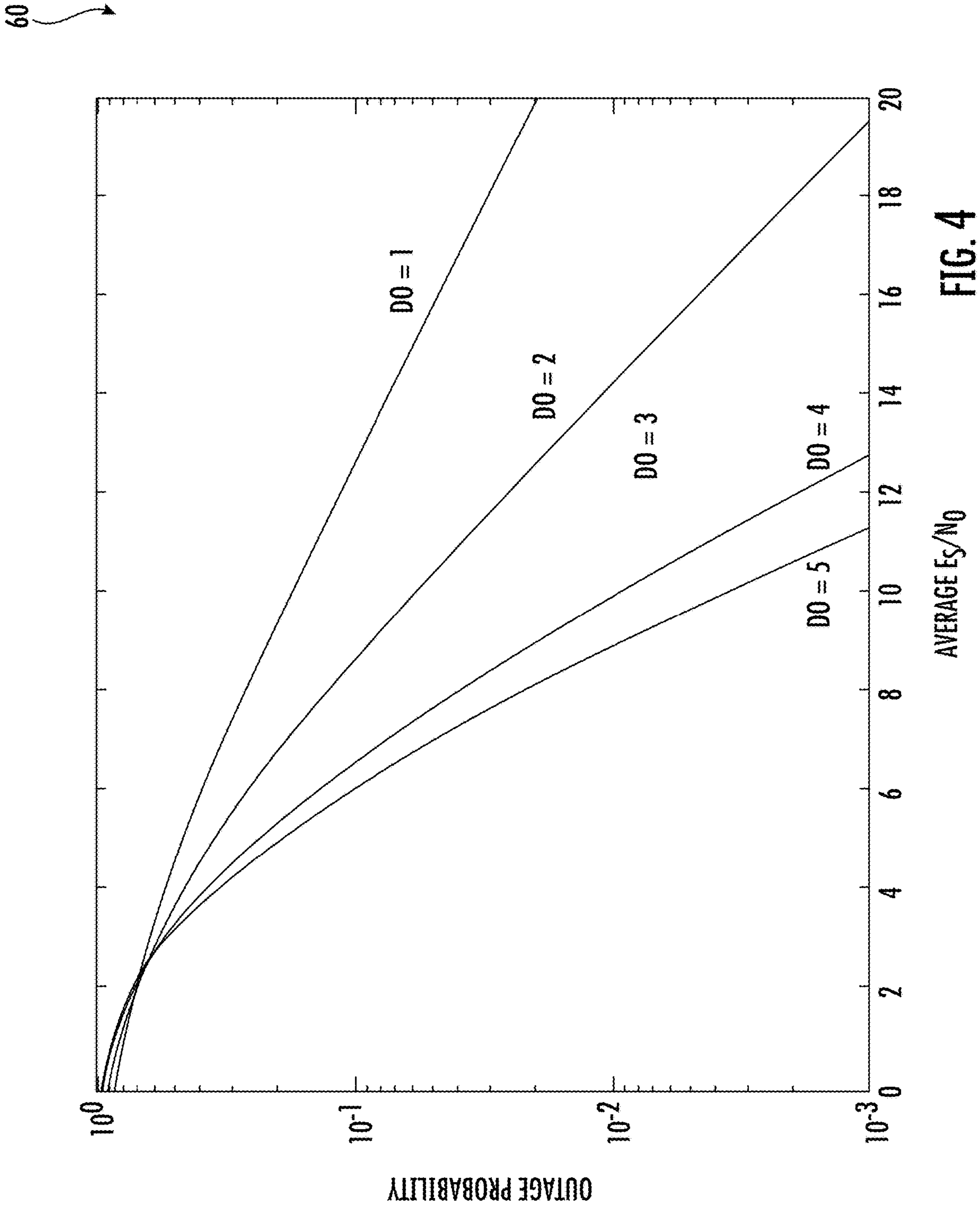
FIG. 4 is a graph of outage probability vs. average signal to noise ratio for different diversity orders for the example implementation of FIG. 2.

Referring again to FIG. 2 and additionally to the graph 60 of FIG. 4, the scalable diversity rake receiver 30 uses spatial diversity to increase receiver diversity, which in turn helps reduce outage likelihoods. This is advantageous when little relative motion exists between transmitter and receiver, e.g., ship-born or hand-held radios. As shown in the graph 60, for a diversity order of 1 (DO=1), the outage rate could be as high as 10% at a signal to noise ratio (SNR) of Es/N0=13 dB. At that same SNR, outages fall to 0.3% with a diversity order of 3, as would be realized by splitting the despreader configuration shown in FIG. 2 across three antennas, for example. This is a significant difference with only modest impacts to processing resources. In addition to significant resource savings, this may be done with tracking that is less susceptible to requiring re-acquisition during fades.

A related method may include operating a plurality of diversity receive paths 31*a*, 31*b*, with each diversity receive path including a respective rake receiver despreader 32*a*, 32*b*. The method may further include operating a tracking loop 33 to generate a composite timing signal based upon the plurality of rake receiver despreaders 32*a*, 32*b*, and provide the composite timing signal to the plurality of diversity receive paths, as discussed further above.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A radio frequency (RF) rake receiver comprising:

a plurality of receive paths, each receive path comprising a respective rake receiver despreader comprising a plurality of rake fingers;

calculation circuitry coupled to the plurality of rake fingers of the respective rake receiver despreader and configured to generate a log-likelihood ratio (LLR) output for each rake finger, calculation circuitry comprising signal power measurement circuitry coupled to a respective rake finger of the plurality of rake fingers, a moving average filter coupled to the signal power measurement circuitry, and path selection circuitry coupled to the moving average filter; and a tracking loop configured to generate a composite timing signal based upon the plurality of rake receiver despreaders and the calculation circuitry, and provide the composite timing signal to the plurality of receive paths; and forward error correction (FEC) decoder circuitry configured to perform error correction on data received via the plurality of receive paths based upon the LLR output.

2. The RF rake receiver of claim 1 wherein each rake receiver despreader comprises a non-sparse rake receiver despreader.

3. The RF rake receiver of claim 1 wherein each receive path comprises a respective downconverter and a fractional interpolator coupled thereto.

4. The RF rake receiver of claim 3 wherein each receive path comprises a respective antenna coupled to the downconverter.

5. The RF rake receiver of claim 3 wherein each receive path comprises a respective matched filter coupled to the downconverter.

6. The RF rake receiver of claim 1 wherein the tracking loop comprises a timing error detector, a loop filter coupled to the timing error detector, and a numerically controlled oscillator coupled to the loop filter.

7. The RF rake receiver of claim 1 wherein the receive paths comprise at least one of spatial diversity receive paths, frequency diversity receive paths, and polarization diversity receive paths.

8. A radio frequency (RF) rake receiver comprising:

a plurality of diversity receive paths, each diversity receive path comprising a respective rake receiver despreader, each rake receiver despreader comprising a plurality of rake fingers arranged in a non-sparse configuration;

calculation circuitry coupled to the plurality of rake fingers of the respective rake receiver despreader and configured to generate a log-likelihood ratio (LLR) output for each rake finger calculation circuitry comprising signal power measurement circuitry coupled to a respective rake finger of the plurality of rake fingers, a moving average filter coupled to the signal power measurement circuitry, and path selection circuitry coupled to the moving average filter; and a tracking loop configured to generate a composite timing signal based upon the plurality of rake receiver despreaders and the calculation circuitry, and provide the composite timing signal to the plurality of diversity receive paths; and forward error correction (FEC) decoder circuitry configured to perform error correction on data received via the plurality of receive paths based upon the LLR output.

9. The RF rake receiver of claim 8 wherein each diversity receive path comprises a respective downconverter and a fractional interpolator coupled thereto.

10. The RF rake receiver of claim 9 wherein each diversity receive path comprises a respective antenna coupled to the downconverter.

11. The RF rake receiver of claim 9 wherein each diversity receive path comprises a respective matched filter coupled to the downconverter.

12. The RF rake receiver of claim 8 wherein the tracking loop comprises a timing error detector, a loop filter coupled to the timing error detector, and a numerically controlled oscillator coupled to the loop filter.

13. The RF rake receiver of claim 8 wherein the diversity receive paths comprise at least one of spatial diversity receive paths, frequency diversity receive paths, and polarization diversity receive paths.

14. A method comprising:

operating a plurality of receive paths, each receive path comprising a respective rake receiver despreader comprising a plurality of rake fingers;

operating calculation circuitry to generate a log-likelihood ratio (LLR output for each rake finger wherein the calculation circuitry is coupled to the plurality of rake fingers of the respective rake receiver despreader, the calculation circuitry comprising signal power measurement circuitry coupled to a respective rake finger of the plurality of rake fingers, a moving average filter coupled to the signal power measurement circuitry, and path selection circuitry coupled to the moving average filter; and operating a tracking loop by generating a composite timing signal based upon the plurality of rake receiver despreaders and the calculation circuitry, and providing the composite timing signal to the plurality of receive paths; and operating forward error correction (FEC) decoder circuitry configured to perform error correction on data received via the plurality of receive paths based upon the LLR output.

15. The method of claim 14 wherein each rake receiver despreader comprises a non-sparse rake receiver despreader.

16. The method of claim 14 wherein each receive path comprises a respective downconverter and a fractional interpolator coupled thereto.

17. The method of claim 16 wherein each receive path comprises a respective antenna coupled to the downconverter.

18. The method of claim 16 wherein each receive path comprises a respective matched filter coupled to the downconverter.

19. The method of claim 14 wherein the tracking loop comprises a timing error detector, a loop filter coupled to the timing error detector, and a numerically controlled oscillator coupled to the loop filter.

20. The method of claim 14 wherein the receive paths comprise at least one of spatial diversity receive paths, frequency diversity receive paths, and polarization diversity receive paths.

21. A radio frequency (RF) rake receiver comprising:

a plurality of receive paths, each receive path comprising a respective rake receiver despreader comprising a plurality of rake fingers;

calculation circuitry coupled to the plurality of rake fingers of the respective rake receiver despreader and configured to generate a log-likelihood ratio (LLR) output for each rake finger, the calculation circuitry comprising signal power measurement circuitry coupled to a respective rake finger of the plurality of rake fingers, path selection circuitry cooperating with the signal power measurement circuitry and configured to exclude rake finger signal energy below a threshold level, and a moving average filter coupled to the signal power measurement circuitry and the path selection circuitry; and a tracking loop configured to generate a composite timing signal based upon the plurality of rake receiver despreaders and the calculation circuitry, and provide the composite timing signal to the plurality of receive paths; and forward error correction (FEC) decoder circuitry configured to perform error correction on data received via the plurality of receive paths based upon the LLR output.

22. The RF rake receiver of claim 21 wherein each rake receiver despreader comprises a non-sparse rake receiver despreader.

* * * * *